United States Patent
Zhang et al.

[11] Patent Number: 6,097,454
[45] Date of Patent: Aug. 1, 2000

[54] DISPLAY DEVICE

[75] Inventors: Hongyong Zhang; Naoaki Yamaguchi; Yasuhiko Takemura, all of Kanagawa, Japan

[73] Assignee: Semiconductor Energy Laboratory Co., Ltd., Kanagawa-ken, Japan

[21] Appl. No.: 09/345,110

[22] Filed: Jun. 29, 1999

Related U.S. Application Data

[62] Division of application No. 08/881,872, Jun. 24, 1997.

[30] Foreign Application Priority Data

Jun. 25, 1996 [JP] Japan ................................ 8-185639
Jun. 25, 1996 [JP] Japan ................................ 8-185640

[51] Int. Cl.$^7$ ........................................ G02F 1/136
[52] U.S. Cl. ....................... 349/43; 349/42; 349/133; 349/141
[58] Field of Search ..................... 349/43, 42, 38, 349/138, 139, 141

[56] References Cited

U.S. PATENT DOCUMENTS

| | | |
|---|---|---|
| 4,759,610 | 7/1988 | Yanagisawa . |
| 5,162,933 | 11/1992 | Kakuda et al. . |
| 5,185,601 | 2/1993 | Takeda et al. . |
| 5,459,595 | 10/1995 | Ishiguro et al. . |
| 5,459,596 | 10/1995 | Ueda et al. . |
| 5,499,123 | 3/1996 | Mikoshiba . |
| 5,517,341 | 5/1996 | Kim et al. . |
| 5,598,285 | 1/1997 | Kondo et al. ............................ 349/141 |
| 5,734,451 | 3/1998 | Yanagawa et al. ..................... 349/141 |
| 5,831,707 | 11/1998 | Masuyuki et al. ...................... 349/141 |

*Primary Examiner*—Robert H. Kim
*Attorney, Agent, or Firm*—Fish & Richardson P.C.

[57] ABSTRACT

In an active matrix liquid-crystal display device, a metal common electrode 22 that also serves as a black matrix is disposed to cover the peripheral portion of a pixel electrode 24 which is formed of a transparent electrically conductive film. The common electrode 22 functions as the black matrix that covers the peripheral portion of a pixel and is held to a given potential, so that a region where the pixel electrode 24 and the common electrode 22 are overlapped with each other functions as an auxiliary capacitor 25. The auxiliary capacitor is structured through an insulation layer 23. The common electrode 22 is formed on the insulation layer 21 having a flatten surface to make the auxiliary capacitor 25 larger. With this structure, even though the insulation layer 23 is thinned to about 1 μm, a pin hole, leakage, etc., between the common electrode and the pixel electrode can be prevented, to thereby obtain a larger auxiliary capacitor.

15 Claims, 5 Drawing Sheets

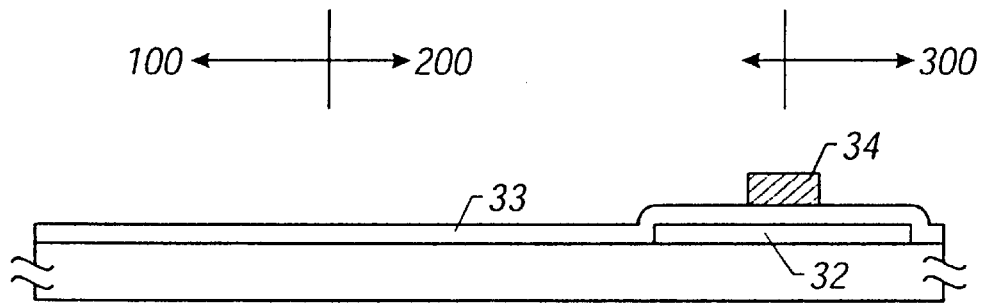
FIG. 5A
FIG. 5B
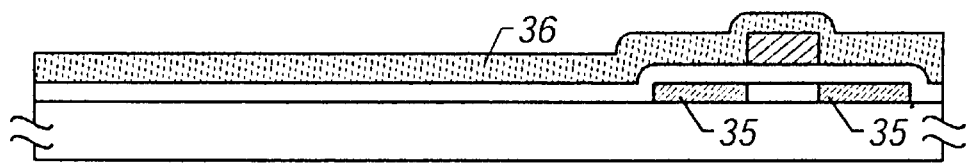
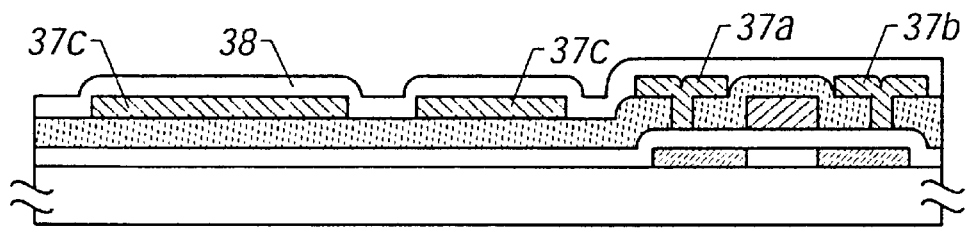
FIG. 5C
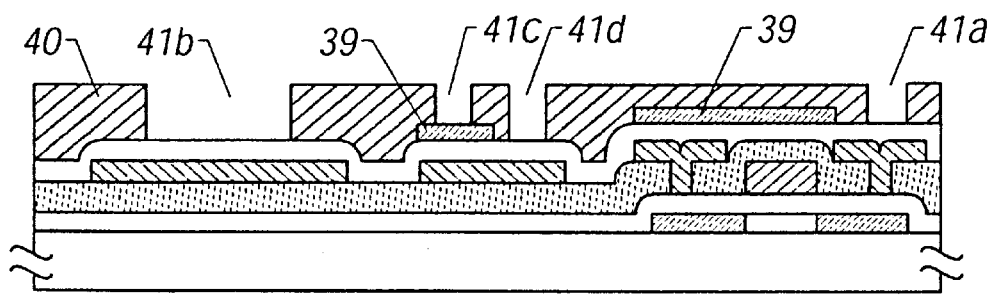
FIG. 5E
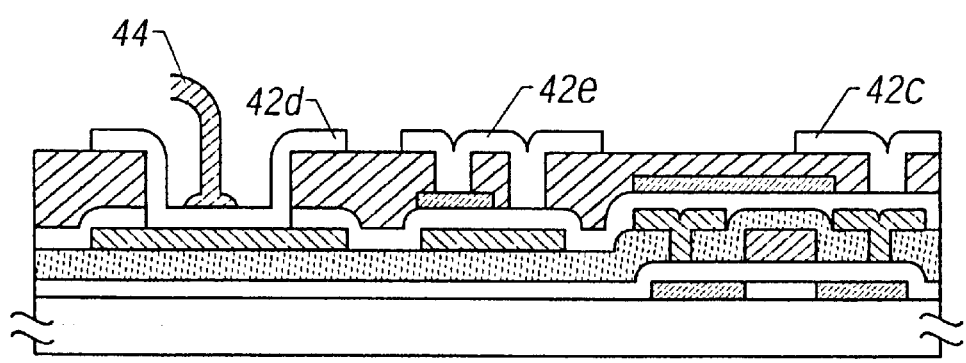
FIG. 5F

DISPLAY DEVICE

This is a divisional of U.S. application Ser. No. 08/881,872, filed Jun. 24, 1997, (pending).

BACKGROUND OF THE INVENTION

1. Field of the Invention

The present invention relates to the structure of pixels in an active matrix display device (in particular, a crystal liquid display device), and more particularly to the structure of an auxiliary capacitor and a black matrix (BM) connected in parallel with a pixel electrode. Also, the present invention relates to the structure of pixels in a flat panel display device that widely requires a black matrix.

2. Description of the Related Art

There has been known a display device having an active matrix circuit. This display device is structured such that a plurality of source wirings for transmitting image data, a plurality of gate wirings which are disposed to intersect with the plurality of source wirings for transmitting a switching signal, and a plurality of pixels disposed at their intersections, in which transistors (in particular, thin-film transistors) are normally used as switching elements.

Each of the pixels includes not only a transistor for switching but also a pixel electrode, and is structured such that a gate electrode of the transistor is connected to a gate wiring, a source thereof is connected to a source wiring, and a drain thereof is connected to the pixel electrode. It should be noted that the source and the drain are not regularly distinct from the viewpoint of the operation of the transistor, and alternate fluctuate depending on a signal from the viewpoint of the definition of the normal electric circuit. However, in the following description, of the impurity regions provided in the transistor, an impurity region which is merely connected to the source wiring is called "source", and another impurity region which is connected to the pixel electrode is called "drain".

Each pixel includes at least one transistor, and in particular, a pixel in which two or more transistors are connected in series is effective because a leak current can be reduced even in a condition where the transistor is in a non-selected state. Even in the above case, an impurity region which is not connected to any one of the source wiring and the pixel electrode is not particularly defined with the application of the above-mentioned definition.

The pixel electrode is disposed such that a capacitor is formed between the pixel electrode and an electrode that faces with the pixel electrode through liquid crystal. The above transistor functions as a switching element that takes out charges from the capacitor or puts the charges into the capacitor. However, in an actual operation, a value of the capacitor formed by only the pixel electrode portion is too small so that a sufficient time and necessary charges cannot be held. For this reason, an auxiliary capacitor must be additionally provided.

Up to now, this auxiliary capacitor (also called retention capacitor) was formed between an opaque electrically conductive material such as metal which is additionally provided and the pixel electrode or the semiconductor layer. Normally, a gate wiring on a succeeding line was used as an opposite electrode. However, in the case where the pixel area is large, even a capacitor formed by using the gate wiring is satisfactory, but as the pixel area becomes small, the capacitor formed by using only the gate wiring is not satisfactory, with the result that the gate wiring was required to be widened larger than it is needed in order to ensure the area of the electrode of the auxiliary capacitor. In this structure, since a portion that blocks a light exists within the pixel, the aperture ratio is lowered.

SUMMARY OF THE INVENTION

The present invention has been made in view of the above problem, and therefore an object of the present invention is to provide the structure of a pixel which is capable of obtaining a sufficient capacitor without substantially lowering the aperture ratio.

In particular, the active matrix liquid-crystal display device requires a member that blocks a light, which is called "black matrix", in the periphery of a pixel electrode.

In general, in regions where source wirings and gate wirings which are disposed in the form of a lattice are formed, their upper portions are caused to heap up.

As a result, a rubbing process is not skillfully conducted on an orientation film at those portions, and the orientation of liquid-crystal molecules at those portions is disturbed. This causes such phenomenons that a light is leaked, or conversely a light is not sufficiently transmitted in the periphery of the pixel. Also, a predetermined electro-optical operation cannot be performed on the liquid crystal on those portions.

The occurrence of the above phenomenons causes display on the periphery of the pixel to be blurred, to thereby lack the clearness of an image as a whole.

As a structure for solving the above problem, there is a structure in which a light-blocking film is so disposed as to cover an edge portion of the pixel electrode. Such a light-blocking film is called "black matrix (BM)".

According to a first aspect of the present invention as described in this specification, as shown in FIGS. 1A to 1E and 2A to 2D, its specific structure is characterized as follows:

1) There is disposed an electrode that covers the source wiring and the gate wiring to block a visual light (since the electrode is held to a given potential, it is called "common electrode").

2) The peripheral portion of the pixel electrode is overlapped with the above common electrode.

3) The above common electrode is formed on a surface of a flattened organic resin layer.

4) The overlapped region functions as an auxiliary capacitor.

With the above structure 1), all the regions except for the pixel electrode and parts of the source and the drain of the transistor can be shielded from an incident light with the common electrode. In particular, the source wiring and the gate wiring can be completely shielded from the exterior. With such a structure, it is possible to prevent such an event that an electromagnetic wave runs in the source wiring and the gate wiring from the exterior, to thereby cause the malfunction or the failure of the operation of the device.

Also, with the above structure 2), the auxiliary capacitor can be formed without lowering the aperture ratio. This is because the black matrix per se is inherently required, and the auxiliary capacitor is formed on the black matrix portion in the present invention.

In this example, the above structure 3) is effective in increasing the capacitor. In the case where the surface of the common electrode is extremely rough, an insulation layer interposed between the common electrode and the pixel electrode must be thickened in order to enhance the insulation between the common electrode and the pixel electrode overlapped with the common electrode. In particular, in the case of using an organic resin film as the insulation layer, the thickness of 2 µm or more is normally required for the organic resin film.

However, when the roughness of the common electrode is small, the thickness of the insulation layer interposed between the common electrode and the pixel electrode is satisfactorily 1 µm or less. Since the capacitor is in inverse proportion to the thickness of the interposed insulation layer, a larger capacitor can be obtained as the insulation layer is thin.

In the above structure, the pixel electrode is made up of a transparent electrically conductive film such as ITO (indium tin oxide) or the like. In the fundamental structure, one pixel electrode is provided for each pixel, however, there is structured such that the pixel electrode is divided into a plurality of parts for one pixel.

The common electrode (black matrix) which is disposed in such a manner that it is overlapped with the peripheral edge portion of the pixel electrode is made of titanium or chromium. As is apparent from the above description, the common electrode also functions as one electrode that constitutes the auxiliary capacitor.

It is preferable that the common electrode is overlapped with the entire peripheral portion of the pixel electrode for the purpose of enhancing a light-blocking. Also, the area of the auxiliary capacitor increases, and the capacitor increases.

Also, when the dielectric constant of the insulation layer interposed between the pixel electrode and the common electrode is set to be higher than the dielectric constant of the organic resin layer on a surface of which the common electrode is formed, it is needless to say that the auxiliary capacitor can be increased. In general, since the capacitive coupling between the respective wirings is large, it was prevented to enhance the dielectric constant of the insulation layer in the semiconductor circuit. However, in the present invention, the source wiring and the gate wiring which are main wirings are shielded from a light with the common electrode, and there is no wiring which is capacitively coupled to the pixel electrode through the above insulation layer. Hence, there arises no problem at all in that the insulation layer is made of a material of a high dielectric constant.

According to a second aspect of the present invention, there is characterized as follows:

1) A common electrode is disposed which is overlapped with the peripheral portion of the pixel electrode to block a light and which is held to a given potential.

2) The above pixel electrode and the above common electrode constitute a capacitor through the insulation layer.

3) The above common electrode is disposed on an organic resin layer whose surface is flattened and which is disposed on the source wiring and the gate wiring.

The operation and effects of the second aspect of the present invention are identical with those of the first aspect as described above.

According to a third aspect of the present invention, for example, as exemplified in FIGS. 1A to 1E and 2A to 2D, there is characterized by including:

1) a pixel electrode layer formed of a transparent electrically conductive film;
2) a common electrode layer made of a light-blocking material;
3) an organic resin layer whose surface is flattened;
4) a source wiring layer; and
5) a gate wiring layer;
   and in that a capacitor is formed between said pixel electrode and the common electrode.

With the above structure, the pixel electrode is disposed on a side nearest to an incident light, and the common electrode (black matrix) is disposed subsequent to the pixel electrode, thereby being capable of perfectly shielding from a light the source wiring, the gate wiring and further the transistor which are disposed below the pixel electrode and the common electrode.

This structure is useful in not only blocking the light but also removing any influence of the electromagnetic wave from the exterior.

According to a third aspect of the present invention, the organic resin layer may be interposed between the pixel electrode and the common electrode. Also, it is preferable that the common electrode is disposed to be overlapped with an edge portion of the pixel electrode because the auxiliary capacitor can be formed on that portion. Furthermore, when the dielectric constant of the insulation layer interposed between the pixel electrode and the common electrode is set to be higher than the dielectric constant of the organic resin layer on a surface of which the common electrode is formed, needless to say, the auxiliary capacitor can be increased.

Further, in order to solve the above-mentioned problem, according to a fourth aspect of the present invention as described in this specification, there is characterized as follows:

1) An electrode is disposed which covers the source wiring and the gate wiring to block a visual light (since the electrode is held to a given potential, it is called "common electrode").

2) The peripheral portion of the pixel electrode is overlapped with the above common electrode.

3) The above common electrode is connected to a wiring provided in the same layer as that of the source wiring through a film in the same layer as that of the pixel electrode.

The effects of the above structures 1) and 2) are identical with those of the first aspect of the present invention as described above. In particular, in the fourth aspect of the present invention, the common electrode (black matrix) which is disposed in the manner that it is overlapped with the peripheral edge portion of the pixel electrode is made of titanium or chromium. As is apparent from the above description relating to the first aspect of the present invention, the common electrode also functions as one electrode that constitutes the auxiliary capacitor.

For achieving the above structure, it is required that the common electrode is connected to the exterior. In the present invention, in order to achieve that purpose, the above structure 3) is required. In other words, in the structure 3), the wiring in the same layer as that of the source wiring is a wiring which is connected to a portion bonded with an external wiring. However, in a normal process, there is no step in which the common electrode layer is brought in direct contact with the above wiring. For that reason, according to the present invention, the common electrode is electrically connected to the external bonding portion through a film in the same layer as that of the pixel electrode.

The common electrode exists through the wiring portion of a lower layer and an insulation layer (a first insulation layer). Also, the pixel electrode layer exists through another insulation layer (a second insulation layer) which is different from the insulation layer of the common electrode. To achieve the above structure, the second insulation layer is etched on the common electrode and a portion where no common electrode exists, respectively, to form contact holes. Sequentially, the first insulation layer is also etched to form contact holes. At this time, it is desirable that the common electrode is not etched during the latter etching step.

Through the above process, the contact holes (first contact holes) that reach the common electrode and the contact holes (second contact holes) that reach the wiring of the lower layer are formed. Thereafter, a transparent electrically conductive film is formed, and then etched by the same process as that of forming the pixel electrode, in such a manner that a wiring that connects the first contact hole to the second contact hole is formed of the transparent electrically conductive film. Thus, the common electrode is connected to the external wiring.

According to a fifth aspect of the present invention, there is characterized as follows:

1) A common electrode is disposed which is overlapped with the peripheral portion of the pixel electrode to block a light.

2) There is provided a film which is formed in the same layer as that of the pixel electrode and is in contact with the wiring in the same layer as that of the common electrode and the source electrode. The operation and effects of the second aspect of the present invention are identical with those described with reference to the fourth aspect of the present invention.

In the above-mentioned fourth or fifth aspect of the present invention, the insulation layer (second insulation layer) between the pixel electrode layer and the common electrode may be designed so that its surface is flattened using organic resin such as polyimide or acrylic resin.

Also, in the first or second aspect of the present invention, the insulation layer (second insulation layer) between the pixel electrode layer and the common electrode may be made of a high dielectric material. In particular, it is better to use an insulation layer which is higher in dielectric constant than the insulation layer (first insulation layer) on the surface of which the common electrode is formed.

When the dielectric constant of the insulation layer interposed between the pixel electrode and the common electrode is set to be higher than the dielectric constant of the organic resin layer on a surface of which the common electrode is formed, it is needless to say that the auxiliary capacitor can be increased. In general, since the capacitive coupling between the respective wirings is large, it was prevented to enhance the dielectric constant of the insulation layer in the semiconductor circuit. However, in the present invention, the source wiring and the gate wiring which are main wirings are shielded from a light with the common electrode, and there is no wiring which is capacitively coupled to the pixel electrode through the above insulation layer. Hence, there arises no problem at all in that the insulation layer is made of a material of a high dielectric constant.

Also, in order to make bonding firm, in the above fourth or fifth aspect of the present invention, a portion to be bonded (bonding pad) may be of a multi-layer structure consisting of a film which is the same layer as that of the pixel electrode and a wiring which is the same layer as that of the source wiring.

BRIEF DESCRIPTION OF THE DRAWINGS

The above and other objects and features of the present invention will be more apparent from the following description taken in conjunction with the accompanying drawings.

FIGS. 5A to 5C, 5E and 5F are cross-sectional views showing a manufacturing process in accordance with the second embodiment.

DETAILED DESCRIPTION OF THE PREFERRED EMBODIMENTS

Now, a description will be given in more detail of preferred embodiments of the present invention with reference to the accompanying drawings.

(First Embodiment)

Figure 1A:
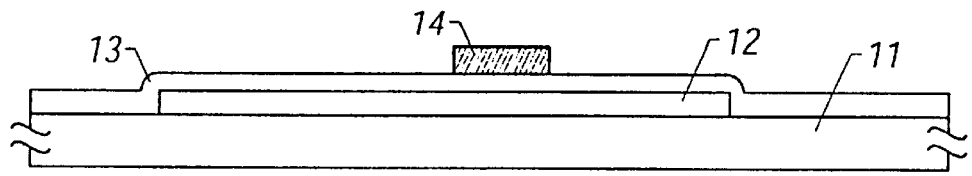
FIGS. 1A to 1E are cross-sectional views showing a manufacturing process in accordance with a first embodiment of the present invention.
Figure 1B:
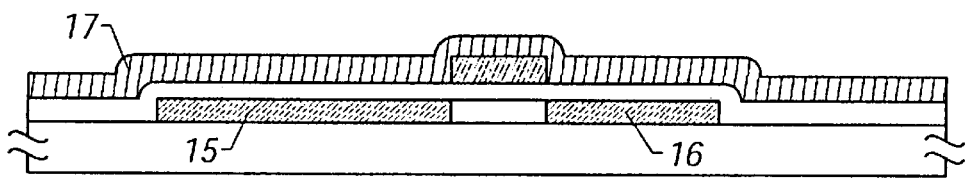
Figure 1C:
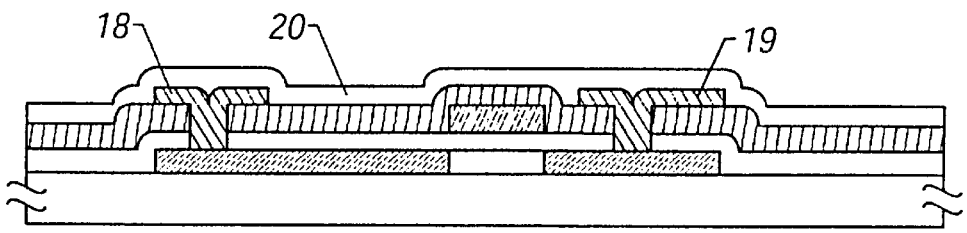
Figure 1D:
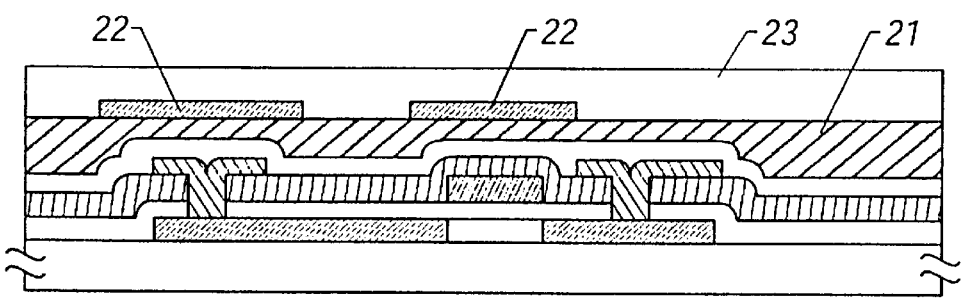
Figure 1E:
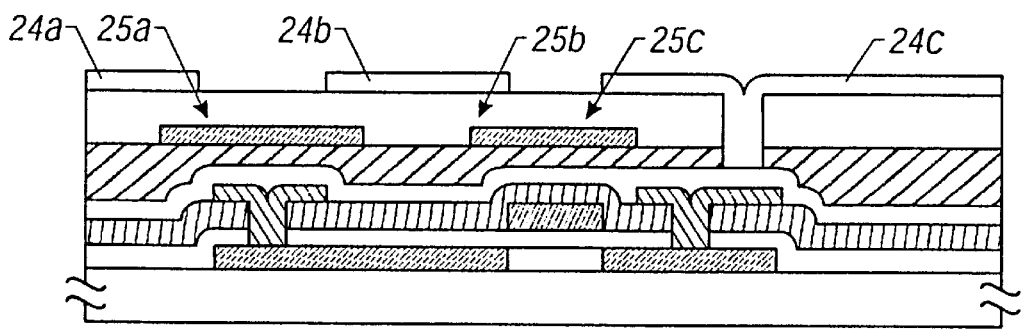
Figure 2A:
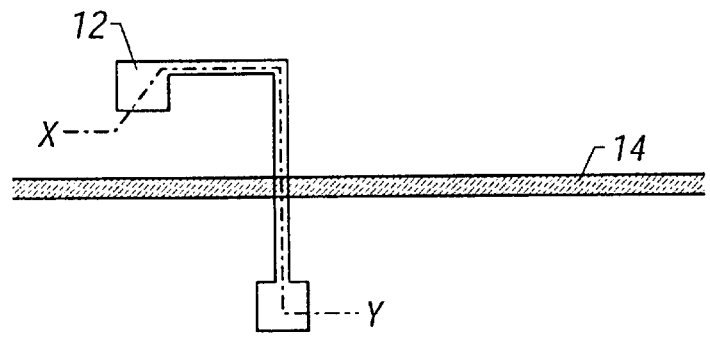
FIGS. 2A to 2D show the arrangement of wirings and so on in accordance with the first embodiment.

FIGS. 1A to 1E and 2A to 2D show the structure of a pixel in an active matrix liquid-crystal display device in accordance with the present invention. FIGS. 1A to 1E show the outline of cross-sectional views representative of a manufacturing process in accordance with this embodiment, and FIGS. 2A to 2D show the arrangement of the respective wirings, a common electrode, a pixel electrode, a semiconductor layer, etc., in accordance with this embodiment. Reference numerals in FIGS. 2A to 2D correspond to those in FIGS. 1A to 1E. The cross section taken along a dotted line X-Y in FIG. 2A is shown in FIGS. 1A to 1E. FIGS. 1A to 1E show the conceptual structures, which are not strictly identical with the arrangements shown in FIGS. 2A to 2D.

Also, what are shown in FIGS. 1A to 1E and 2A to 2D are only the structure on a substrate side where a thin-film transistor is disposed. However, in fact, there also exists a substrate (opposite substrate) which is opposite to the above substrate in such a manner that liquid crystal is held between the opposite substrate and the substrate shown in FIGS. 1A to 1E at an interval of several $\mu$m.

Hereinafter, a manufacturing process will be described with reference to FIGS. 1A to 1E. As shown in FIG. 1A, a semiconductor layer (active layer) 12 of a transistor is formed on a glass substrate 11 on which a silicon oxide film (not shown) of an under layer is provided.

The active layer 12 is made up of a crystalline silicon film which has been obtained by crystallizing an amorphous silicon film by heating or the irradiation of a laser beam. A gate insulation film 13 is formed to cover the active layer 12. It is preferable that the material of the gate insulation film 13 is silicon oxide or silicon nitride, and for example, a silicon oxide film formed through the plasma CVD method may be used. A gate wiring (gate electrode) 14 made of aluminum-titanium alloy is formed on the gate insulation film 13 through a known sputtering method (FIG. 1A).

The arrangement of the circuit in this state is shown in FIG. 2A (FIG. 2A).

Then, n-type or p-type impurities are introduced into the active layer 12 through a known ion doping method with the gate wiring 14 as a mask, to thereby form a source 15 and a drain 16. After the introduction of the impurities, the activation of the impurities (re-crystallization of the semiconductor film) may be conducted through the heat annealing, the laser annealing, etc., if necessary.

After the above process, a silicon nitride film (or a silicon oxide film) is deposited through the plasma CVD method. This film functions as a first interlayer insulator 17 (FIG. 1B).

Subsequently, contact holes that reach the source region 15 and the drain region 16 are formed in the first interlayer insulator 17, respectively. Then, a multi-layer film consisting of a titanium layer and an aluminum layer is formed through a known sputtering method, and then etched to form a source wiring 18 and a drain electrode 19.

Figure 2B:
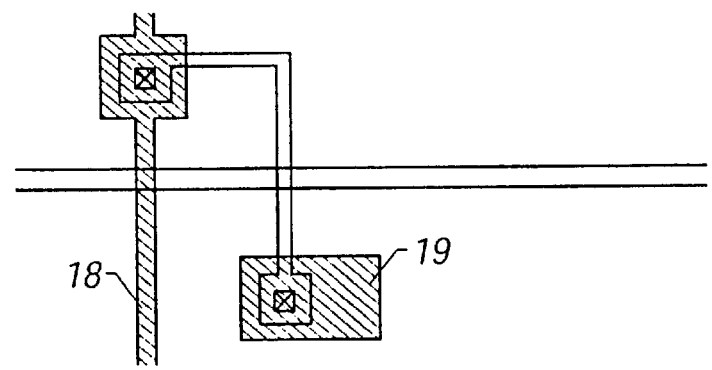

After the above process, a silicon nitride film (or a silicon oxide film) is deposited through the plasma CVD method. This film functions as a second interlayer insulator 20. It is preferable to use silicon nitride as the second interlayer insulator 20. It is effective in preventing the impurities existing in the organic resin layer of the upper layer from permeating the transistor of the lower layer (FIG. 1C). The arrangement of the circuit in this state is shown in FIG. 2B (FIG. 2B).

Figure 2C:
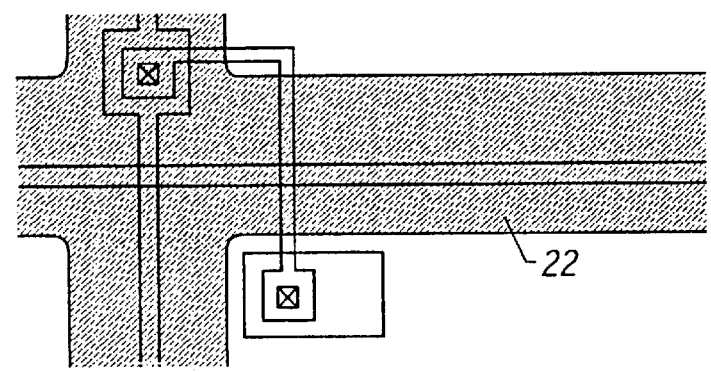

Thereafter, a first organic resin layer 21 is formed through the spin filming method. The mass productivity can be enhanced by using the print method instead of the spin filming method. The upper surface of the organic resin layer 21 is flattened. Then, a chromium film is formed through the known sputtering method and etched to form a common electrode 22. Chromium may be replaced by titanium (FIG. 1D). The arrangement of the circuit in this state is shown in FIG. 2C. As is apparent from the figure, the common electrode 22 is so formed as to cover the source wiring 18 and the gate wiring 14 (FIG. 2C).

Furthermore, a second organic resin layer 23 is formed through the spin filming method. It is required that the thickness of the second organic resin layer 23 is thicker than the thickness of the common electrode 22, and typically it is preferable to be set to 0.5 to 1 $\mu$m. In this case, the thickness of a portion of the second organic resin layer 23 on the common electrode 22 can be set to be 0.3 $\mu$m or more. Then, the second organic resin layer 23 and the first organic resin layer 21 as well as the second interlayer insulator 20 is sequentially etched to form a contact hole that reaches the drain electrode 19.

Subsequently, an ITO film is formed through the known sputtering method and then etched to form pixel electrodes 24a, 24b and 24c. The pixel electrode 24c is a pixel electrode of the transistor, and the pixel electrodes 24a and 24b are pixel electrodes adjacent to each other.

Capacitors 25a, 25b and 25c are formed on portions where the pixel electrodes 24a to 24c are overlapped with the common electrode 22 through the second organic resin layer 23, respectively.

Because the surface of the first organic resin layer 21 is flattened, the roughness of the common electrode is reduced so that the second organic resin layer 23 can be thinned. For that reason, the capacitors 25a to 25c can be made large (FIG. 1E).

Figure 2D:
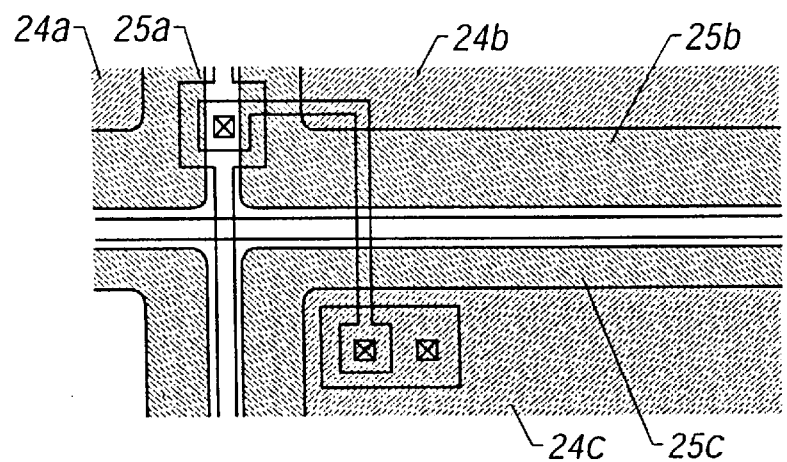

The arrangement of the circuit in this state is shown in FIG. 2D. It should be noted that in the figure, the positions of the pixel electrodes 24a, 24b and 24c and the positions of portions where the pixel electrodes 24a, 24b and 24c are overlapped with the common electrode 22 (that is, portions where the capacitors exist) are indicated by meshes for facilitation of understanding. As is apparent from the figure, the pixel electrodes 24a, 24b and 24c are formed so as to be overlapped with the common electrode 22, respectively, and the common electrode 22 functions as the black matrix. For example, the occurrence or the storage of charges by the irradiation of an intense light can be prevented.

Also, the common electrode 22 functions not only as a shield from a light but also as a shield against an electromagnetic wave from the exterior. In other words, the common electrode 22 also has a function to prevent the entry of an unnecessary signal caused when the gate wiring 14 and the source wiring 18 function as an antenna (FIG. 2D).

It should be noted that as is apparent from FIG. 2C, the common electrode 22 is disposed to cover even a channel of the thin-film transistor. This is because the operation of the thin-film transistor is prevented from being adversely affected by the irradiation of a light onto the thin-film transistor.

In this example, there is shown a structure in which the second organic resin layer 23 is of a single layer. However, it may be of a multi-layer structure. Also, it may be made of an inorganic material or a material of a high dielectric constant. This is because the pixel electrodes 24a, 24b and 24c are not capacitively coupled with the wirings of the lower layer through the insulation layer that corresponds to the second organic resin layer 23 at all. When the insulation layer that corresponds to the second organic resin layer 23 is made of a high dielectric material, it is effective in enhancement of the auxiliary capacitor.

(Second Embodiment)

Figure 3A:
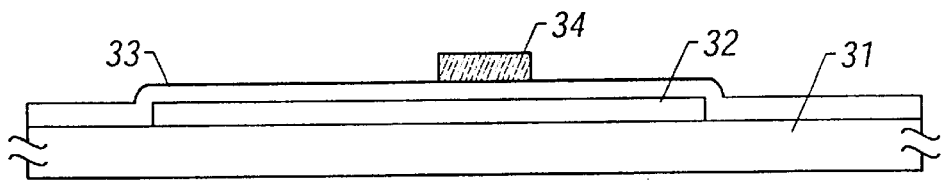
FIGS. 3A to 3E are cross-sectional views showing a manufacturing process in accordance with a second embodiment of the present invention.
Figure 3B:
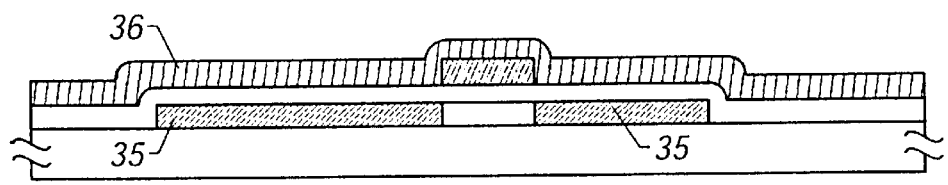
Figure 3C:
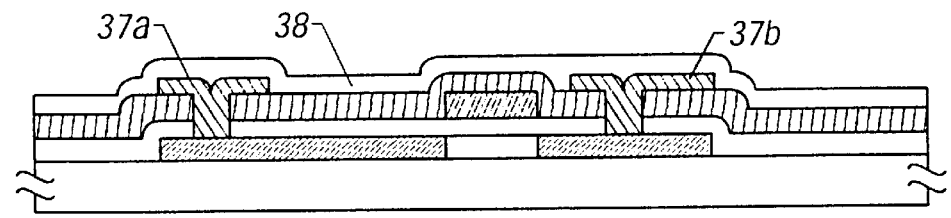
Figure 3D:
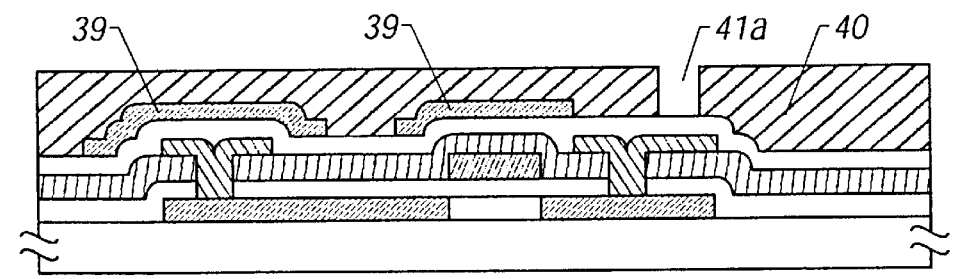
Figure 3E:
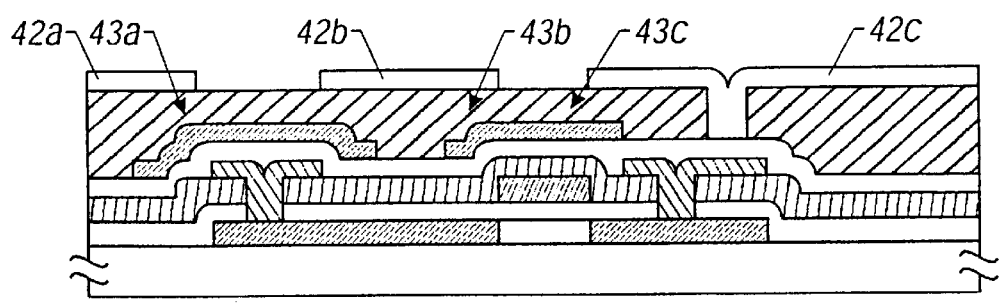
Figure 4A:
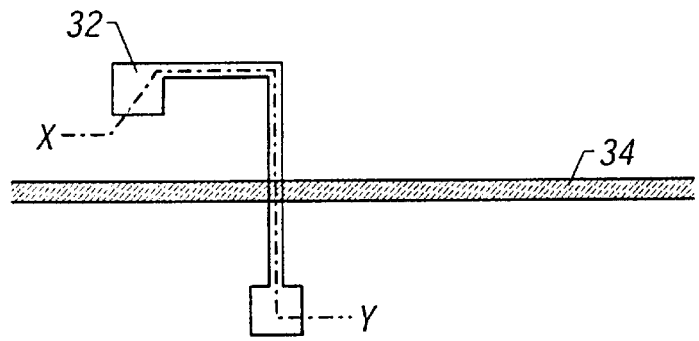
FIGS. 4A to 4D show the arrangement of wirings and so on in accordance with the second embodiment.

FIGS. 3A to 3E, 4A to 4D and FIGS. 5A to 5C, 5E and 5F show the structure of a pixel in an active matrix liquid-crystal display device in accordance with the present invention. FIGS. 3A to 3E show the outline of cross-sectional views of a process for manufacturing a TFT portion of a pixel in accordance with this embodiment, and FIGS. 4A to 4D show the arrangement of the respective wirings, a common electrode, a pixel electrode, a semiconductor layer and the like of the pixel in accordance with this embodiment. The cross section taken along a dotted line X-Y in FIG. 4A is shown in FIGS. 3A to 3E. FIGS. 3A to 3E show the conceptual structures which are not strictly identical with the arrangements shown in FIGS. 4A to 4D. FIGS. 5A to 5C, 5E and 5F show cross-sectional views of a process for manufacturing an external lead-out terminal of the display device (a bonded portion, a terminal region 100), a contact portion where the common electrode is in contact with a wiring of the lower layer (an interlayer contact region 200), and a TFT region 300. Like parts are designated by the same reference numerals in all the figures.

Also, FIGS. 3A to 3E, 4A to 4D, and 5A to 5C, 5E and 5F show only the structure on a substrate side where a thin-film transistor is disposed. However, in fact, there also exists a substrate (opposite substrate) which is opposite to the above substrate in such a manner that liquid crystal is held between the opposite substrate and the substrate shown in FIGS. 3A to 3E at an interval of several $\mu$m.

Hereinafter, a manufacturing process will be described. As shown in FIG. 3A, a semiconductor layer (active layer) 32 of a transistor is formed on a glass substrate 31 on which a silicon oxide film (not shown) of an under layer is provided.

The active layer 32 is made up of a crystalline silicon film which has been obtained by crystallizing an amorphous silicon film by heating or the irradiation of a laser beam. A gate insulation film 33 is formed to cover the active layer 32. It is preferable that the material of the gate insulation film 33 is silicon oxide or silicon nitride, and for example, a silicon oxide film formed through the plasma CVD method may be used. A gate wiring (gate electrode) 34 made of aluminum-titanium alloy is formed on the gate insulation film 33 through a known sputtering method (FIGS. 3A and 5A).

The arrangement of the circuit in this state is shown in FIG. 4A (FIG. 4A).

Then, n-type or p-type impurities are introduced into the active layer 32 through a known ion doping method with the gate wiring 34 as a mask, to thereby form an impurity region 35. After the introduction of the impurities, the activation of the impurities (re-crystallization of the semiconductor film)

may be conducted through the heat annealing, the laser annealing, etc., if necessary.

After the above process, a silicon nitride film (or a silicon oxide film) is deposited through the plasma CVD method. This film functions as a first interlayer insulator 36 (FIGS. 3B and 5B).

Subsequently, a contact hole that reaches the impurity region 35 are formed in the first interlayer insulator 36. Then, a multi-layer film consisting of a titanium layer and an aluminum layer is formed through a known sputtering method, and then etched to form a source wiring 37a and a drain electrode 37b. Further, a wiring 37c which is connected to a bonding pad is formed. In FIG. 5C, the wiring 37c is shown in both of a TFT region 300 and an interlayer contact region 200, although they are identical.

After the above process, a silicon nitride film (or a silicon oxide film) is deposited through the plasma CVD method. This film functions as a second interlayer insulator 38 (FIGS. 3C and 5C).

Figure 4B:
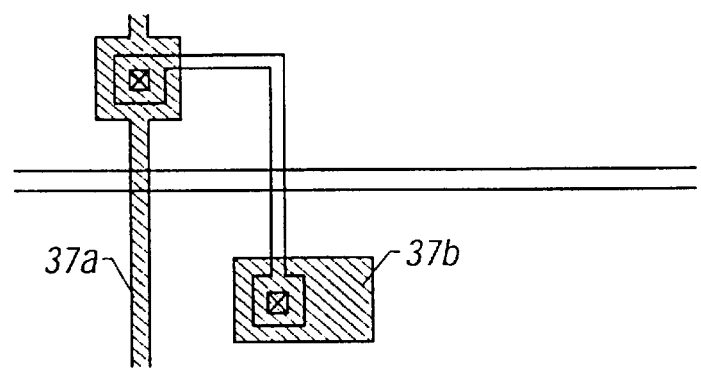

The arrangement of the circuit in this state is shown in FIG. 4B (FIG. 4B).

Then, a chromium film is formed through the known sputtering method and then etched to form a common electrode 39c. Chromium may be replaced by titanium.

Figure 4C:
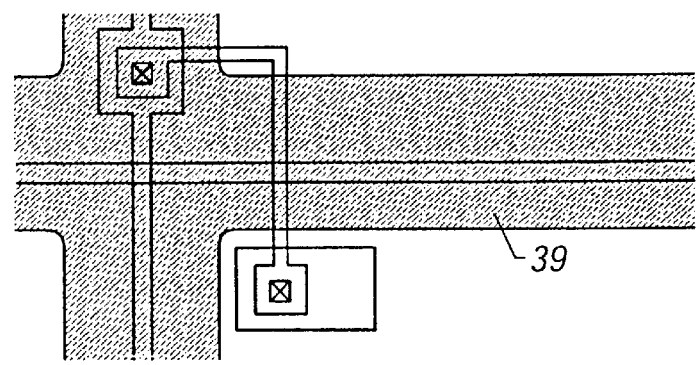

The arrangement of the circuit at a pixel portion in this state is shown in FIG. 4C. As is apparent from the figure, the common electrode 39 is so formed as to cover the source wiring 37a and the gate wiring 37b (FIG. 4C).

Furthermore, an organic resin layer 40 of polyimide is formed through the spin filming method. It is required that the thickness of the organic resin layer 40 should be thicker than the thickness of the common electrode 39, and typically it may be set to 0.5 to 1 μm. In this case, the thickness of a portion of the organic resin layer 40 on the common electrode 39 can be set to be 0.3 μm or more. Then, a contact hole 41 is formed in the organic resin layer 40. In this example, the contact hole 41a is designed to form a contact that connects the pixel electrode and the TFT. Also, the contact hole 41b is an opening of the bonding portion. Further, the contact holes 41c and 41d are contact holes for providing a wiring that connects the common electrode and the wiring of the lower layer in accordance with the present invention (FIGS. 3D and 5D).

Further, etching is proceeding, so that the second interlayer insulation layer 38 is also etched. Through this process, the contact holes 41a, 41b and 41d reach the wiring 37 of the lower layer. However, etching for the contact hole 41c does not proceed any longer because the common electrode 39 serves as an etching stopper.

Subsequently, an ITO film is formed through the known sputtering method and then etched to form pixel electrodes 42a, 42b, 42c, a protective film 42d on the surface of the bonding portion and an interlayer connection wiring 42e.

The pixel electrode 42c is a pixel electrode of the transistor, and the pixel electrodes 42a and 42b are pixel electrodes adjacent to each other. In this embodiment, the protective film 42d is in contact with only the wiring 37c, and the interlayer connection wiring 42e is in contact with only the wiring 37c and the common electrode 39.

Capacitors 43a, 43b and 43c are formed on portions where the pixel electrodes 42a to 42c are overlapped with the common electrode 39 through the organic resin layer 40, respectively. The contact hole 41b (bonding pad) is connected to the bonding wiring 44. In that portion, the wiring 37c and the protective film 42d of the transparent electrically conductive film are provided in the form of multiple layers, and since the surface of the protective film 42d is not deteriorated by the air, stabilized bonding can be always performed (FIGS. 3E and 5E).

Figure 4D:
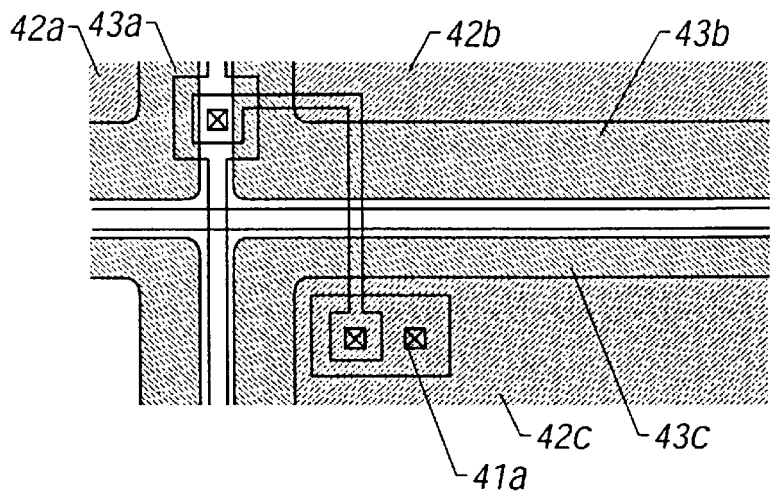

The arrangement of the circuit on the pixel portion in this state is shown in FIG. 4D. It should be noted that in the figure, the positions of the pixel electrodes 42a, 42b and 42c and portions where the pixel electrodes 42a, 42b and 42c are overlapped with the common electrode 39 (that is, portions where the capacitors 43a, 43b and 43c exist) are indicated by meshes for facilitation of understanding. As is apparent from the figure, the pixel electrodes 42a, 42b and 42c are formed so as to be overlapped with the common electrode 39, respectively, and the common electrode 39 functions as the black matrix. For example, the occurrence or the storage of charges by the irradiation of an intense light can be prevented.

Also, the common electrode 39 functions not only as a shield from a light but also as a shield against an electromagnetic wave from the exterior. In other words, the common electrode 39 also has a function to prevent the entry of an unnecessary signal caused when the gate wiring 34 and the source wiring 37a function as an antenna (FIG. 4D).

It should be noted that, as is apparent from FIG. 4C, the common electrode 39 is disposed to cover even a channel of the thin-film transistor. This is because the operation of the thin-film transistor is prevented from being adversely affected by the irradiation of a light onto the thin-film transistor.

In this example, there is shown a structure in which the organic resin layer 40 is of a single layer. However, it may be of a multi-layer structure. Also, it may be made of an inorganic material or a material of a high dielectric constant. This is because the pixel electrodes are not at all capacitively coupled with the wirings of the lower layer through the insulation layer that corresponds to the organic resin layer 40. When the insulation layer that corresponds to the organic resin layer 40 is made of a high dielectric material, it is effective in enhancement of the auxiliary capacitor.

As was described above, according to the present invention, since the black matrix that covers the peripheral portion of the pixel electrode and the pixel electrodes are partially overlapped with each other through the insulation film, those overlapped portions can be structured as an auxiliary capacitor. This structure is not a factor that lowers the aperture ratio of the pixel. Also, since the insulation film can be thinned, it is possible to make a value of the capacitor large.

The present invention described in this specification is applicable to not only the active matrix liquid-crystal electro-optical device but also generally a flat panel display device that requires a black matrix that covers the pixel electrode and the periphery of the pixel electrode, and the auxiliary capacitor connected to the thin-film transistor. Thus, the present invention is useful in the industrial field.

The foregoing description of referred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An active matrix display device, comprising:
   a pixel electrode layer which is formed of a transparent electrically conductive film;
   a common electrode layer which is made of a light-blocking material;
   a source wiring layer;
   a gate wiring layer, said pixel electrode layer, said common electrode layer, said source wiring layer and said gate wiring layer being formed in a stated order from an incident light side; and
   an organic resin layer disposed between said common electrode layer and said source wiring layer, a surface of said organic resin layer being flattened;
   wherein a capacitor is formed between said pixel electrode and said common electrode.

2. An active matrix display device according to claim 1, wherein an organic resin layer is interposed between said pixel electrode and said common electrode.

3. An active matrix display device according to claim 1, wherein said common electrode is disposed to be overlapped with an edge portion of said pixel electrode.

4. An active matrix display device according to claim 1, wherein said source wiring and said gate wiring are shielded from an incident light with said common electrode.

5. An active matrix display device according to claim 1, wherein the dielectric constant of the insulation layer interposed between said pixel electrode and said common electrode is higher than the dielectric constant of the organic resin layer on a surface of which said common electrode is formed.

6. An active matrix display device, comprising:
   a source wiring;
   a gate wiring, said source wiring and said gate wiring being disposed in the form of a lattice;
   at least one pixel electrode disposed in a region surrounded by one of said source wiring and said gate wiring; and
   a common electrode disposed between a layer of said pixel electrode and a layer of said source wiring and said gate wiring to cover said source wiring and said gate wiring, said common electrode comprising a material that blocks a visual light;
   wherein the peripheral portion of said pixel electrode is overlapped with said common electrode; and
   wherein said common electrode is connected to a wiring which is formed on a same plane as said source wiring through a film which is formed on a same plane as said pixel electrode.

7. An active matrix display device according to claim 6, wherein an organic resin layer is interposed between a layer of said pixel electrode and said common electrode.

8. An active matrix display device according to claim 6, wherein the dielectric constant of the insulation layer interposed between said pixel electrode and said common electrode is higher than the dielectric constant of the insulation layer on a surface of which said common electrode is formed.

9. An active matrix display device according to claim 6 wherein in a process of etching the insulation layer interposed between a layer of said source electrode and said common electrode, said common electrode is not etched.

10. An active matrix display device according to claim 6, wherein a portion where an external wiring is bonded is of a multilayer structure consisting of a film of the same layer as that of said pixel electrode and a wiring of the same layer as that of said source wiring.

11. An active matrix display device, comprising:
    a source wiring;
    a gate wiring, said source wiring and said gate wiring being disposed in the form of a lattice;
    at least one pixel electrode disposed in a region surrounded by one of said source wiring and said gate wiring;
    a common electrode which is overlapped with the peripheral portion of said pixel electrode and made of a material that blocks a visual light; and
    a film which is of the same layer as that of said pixel electrode and in contact with said common electrode and a wiring of the same layer as that of said source wiring.

12. An active matrix display device according to claim 11, wherein an organic resin layer is interposed between a layer of said pixel electrode and said common electrode.

13. An active matrix display device according to claim 11, wherein the dielectric constant of the insulation layer interposed between said pixel electrode and said common electrode is higher than the dielectric constant of the insulation layer on a surface of which said common electrode is formed.

14. An active matrix display device according to claim 11, wherein in a process of etching the insulation layer interposed between a layer of said source electrode and said common electrode, said common electrode is not etched.

15. An active matrix display device according to claim 11, wherein a portion where an external wiring is bonded is of a multilayer structure consisting of a film of the same layer as that of said pixel electrode and a wiring of the same layer as that of said source wiring.

* * * * *